United States Patent [19]

Henson

[11] Patent Number: 5,123,348
[45] Date of Patent: Jun. 23, 1992

[54] CLUTCH AND BRAKE MECHANISM FOR FRANKING MACHINE EMPLOYING ELECTRO-RHEOLOGICAL FLUID

[75] Inventor: Walter H. Henson, Hornchurch Essex, England

[73] Assignee: Alcatel Business Systems Limited, United Kingdom

[21] Appl. No.: 626,522

[22] Filed: Dec. 12, 1990

[30] Foreign Application Priority Data

Dec. 30, 1989 [GB] United Kingdom ............... 8929364

[51] Int. Cl.$^5$ ............................................ B41F 13/24
[52] U.S. Cl. ............................. 101/245; 101/91; 400/186; 192/21.5
[58] Field of Search .............. 101/91, 76, 52, 245; 400/186, 187; 192/21.5, 58 R, 84 P; 188/164, 267, 268

[56] References Cited

U.S. PATENT DOCUMENTS

| 2,948,371 | 8/1960 | Lehde | 192/21.5 |
|---|---|---|---|
| 3,216,542 | 11/1965 | Comstock | 192/21.5 |
| 3,869,986 | 3/1975 | Hubbard | 101/91 |
| 4,638,732 | 1/1987 | Salazar | 101/91 |
| 4,731,728 | 3/1988 | Muller | 101/91 X |
| 4,896,754 | 1/1990 | Carlson | 192/21.5 |
| 4,926,990 | 5/1990 | Schleuchardt | 101/245 |
| 4,936,568 | 6/1990 | Nobile | 101/91 X |

FOREIGN PATENT DOCUMENTS

| 17406 | 10/1980 | European Pat. Off. | 101/91 |
|---|---|---|---|
| 2048784 | 12/1980 | United Kingdom | 101/91 |
| 2083595 | 3/1982 | United Kingdom | 192/21.5 |
| 2194842 | 3/1988 | United Kingdom | 101/91 |
| 2206082 | 12/1988 | United Kingdom | 101/91 |

Primary Examiner—Edgar S. Burr
Assistant Examiner—Eric Raciti
Attorney, Agent, or Firm—Shoemaker and Mattare, Ltd.

[57] ABSTRACT

A clutch and brake mechanism for a mechanical drive of print drum in a franking machine is disclosed which utilizes a clutch and brake operated by means of electric potentials applied across an electro-rheological fluid. Elements of the clutch and brake are formed with annular walls which are interposed to form opposed electrodes between which the electro-rheological fluid is contained. Application of electric potentials to the fluid is controlled by a microprocessor.

10 Claims, 4 Drawing Sheets

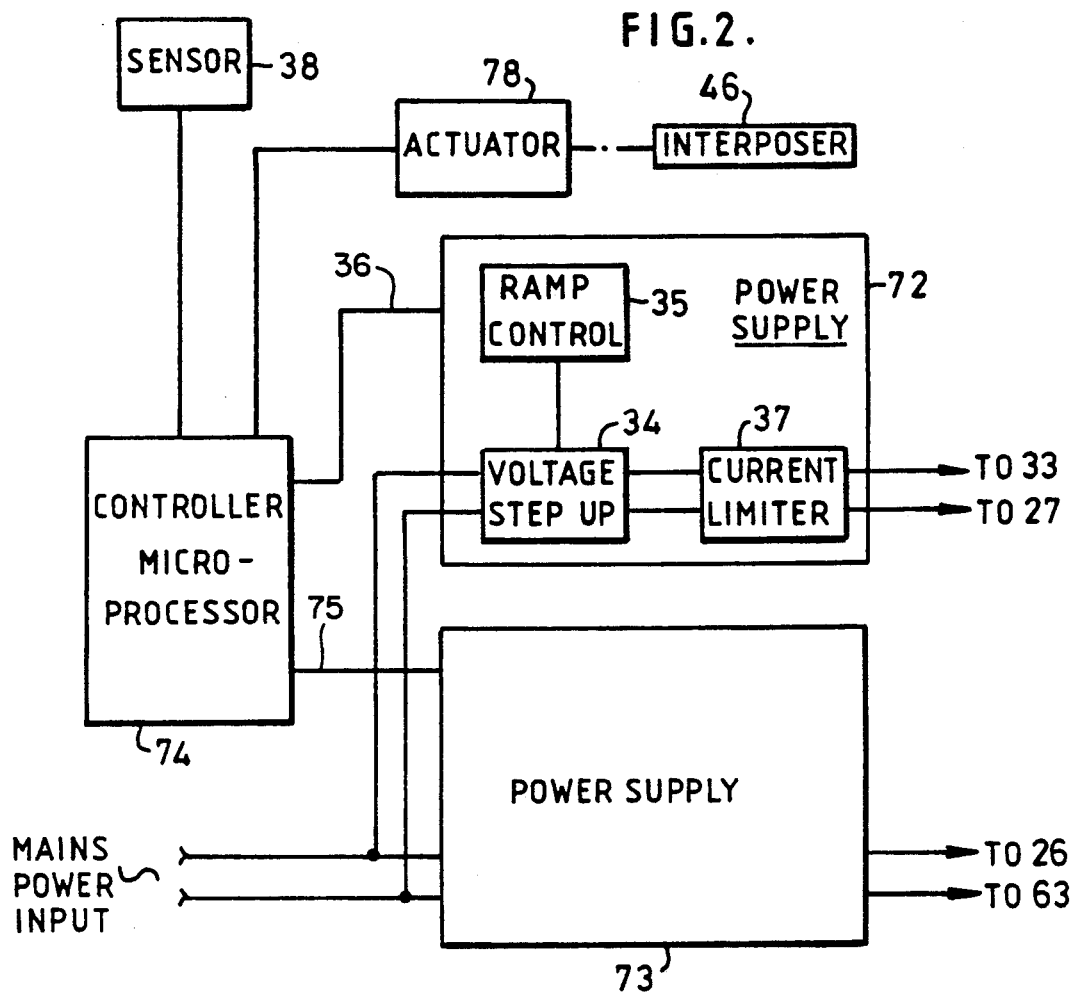
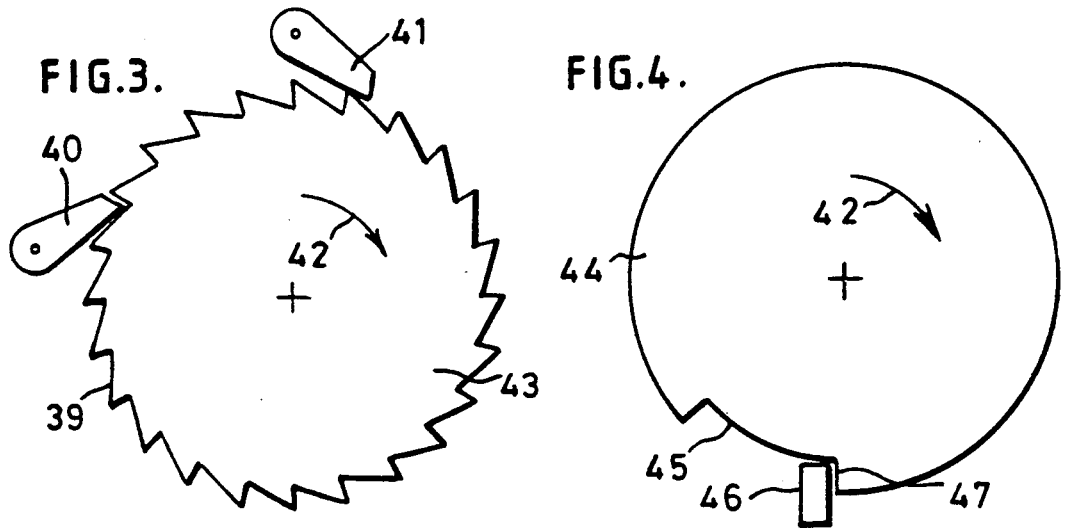

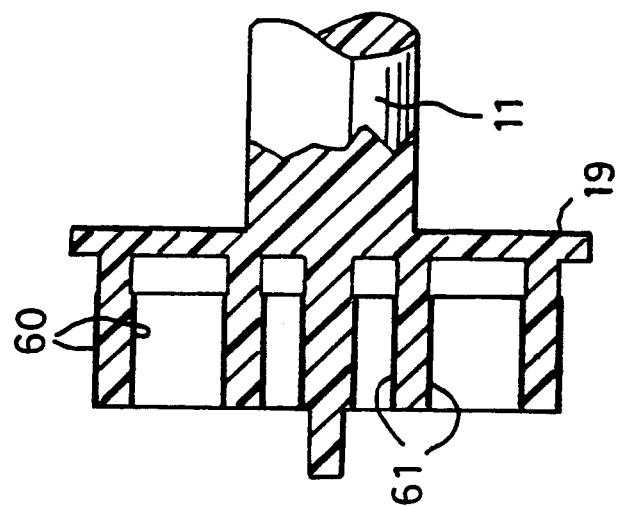
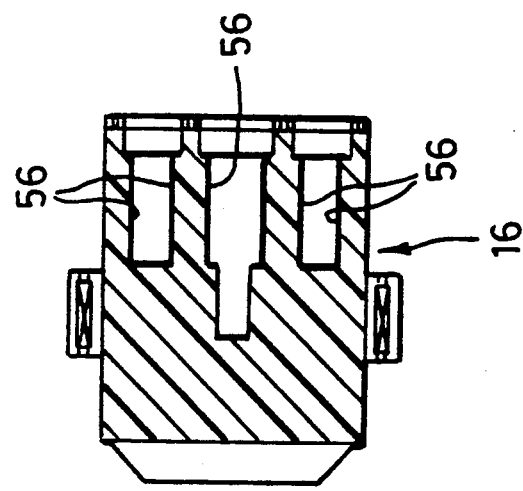
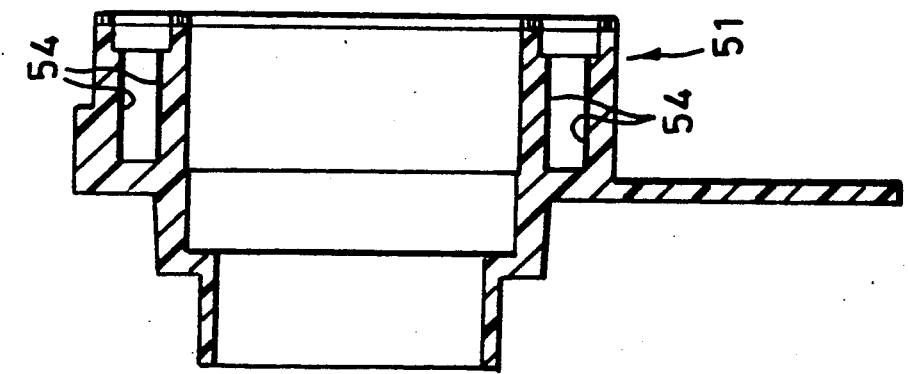
FIG.6.

CLUTCH AND BRAKE MECHANISM FOR FRANKING MACHINE EMPLOYING ELECTRO-RHEOLOGICAL FLUID

BACKGROUND OF THE INVENTION

This invention relates to a clutch and brake mechanism and in particular to such a mechanism for controlling the rotation of a print drum of a postal franking machine.

Postal franking machines are known in which printing of the franking impression is effected by a printing plate carried by a rotatable print drum. The drum usually has a fixed printing plate for printing fixed information such as the authorized pattern of the franking impression and settable print wheels which project through an aperture in the drum for printing the variable information such as the value of the postage charge and the date of franking. When a user desires to frank a mail item, the value of the required postage charge is set into the machine by operation of levers or push buttons and this causes the print wheels to be set to print the required value of postage charge in the franking impression. After setting of the print wheels, the print drum is caused to rotate through a single revolution so as to roll the printing plate and print wheels against the surface of mail item to be franked. The franking machine is provided with means to carry out accounting functions so as to account for the value of postage used. In prepayment systems the accounting means stores a value of credit available for use in franking and this credit value is decremented by the value of postage charge used in each franking operation. Prior to rotating the print drum to print a franking impression, the accounting means carries out a check to determine whether sufficient credit is available for the value of franking to which the machine has been set. If there is sufficient credit, the print drum is released for rotation and is driven, usually by means of a single revolution clutch mechanism, to print the franking impression. Upon completion of the single revolution in which printing is effected the drum is prevented from further rotation by means of locking mechanism and is only released for rotation when the next franking operation is initiated. The print drum is locked against rotation in order to prevent manual rotation of the drum to effect printing of a franking impression without a corresponding accounting by the accounting means in respect of use of the value of the frank.

The single revolution clutch for driving the print drum and the locking means for preventing rotation of the print drum are usually relatively complex mechanisms and when the accounting means comprises electronic circuits it is necessary to provide electromechanical actuators to control operation of the mechanisms. Furthermore the clutches and locking devices tend to snatch in and subject the mechanism to relatively high acceleration and deceleration forces which lead to mechanical wear and failure. These can frequently become limiting factors to the performance and reliability attainable in franking machines.

SUMMARY OF THE INVENTION

According to the invention a franking machine includes a rotatable print drum carrying print elements to print a franking impression on an item during rotation of said drum; a power drive input component; first wall elements rotatable by said power drive input component; second wall elements rotatable with said print drum; said first and second wall elements defining spaces therebetween; said spaces containing material having electro-rheological properties; said material being in a solid state when subjected to an electric field of sufficient magnitude and being in a fluid state when not subjected to that magnitude of electric field; and means selectively operable to apply an electric field to said material of sufficient magnitude to cause the material to solidify and transmit rotational drive from the drive input component to the print drum.

BRIEF DESCRIPTION OF THE DRAWING

An embodiment of the invention will now be described by way of example with reference to the drawings in which:

FIG. 2 is circuit diagram of a high potential power supply, FIG. 3 illustrates an interlock ratchet to prevent reverse rotation of the print drum, FIG. 4 illustrates an interlock to prevent rotation of the drum when the franking machine is not powered, FIG. 6 is an exploded sectional view similar to FIG. 5 illustrating an alternative construction of clutch and brake components,

DESCRIPTION OF THE PREFERRED EMBODIMENT

Figure 1:
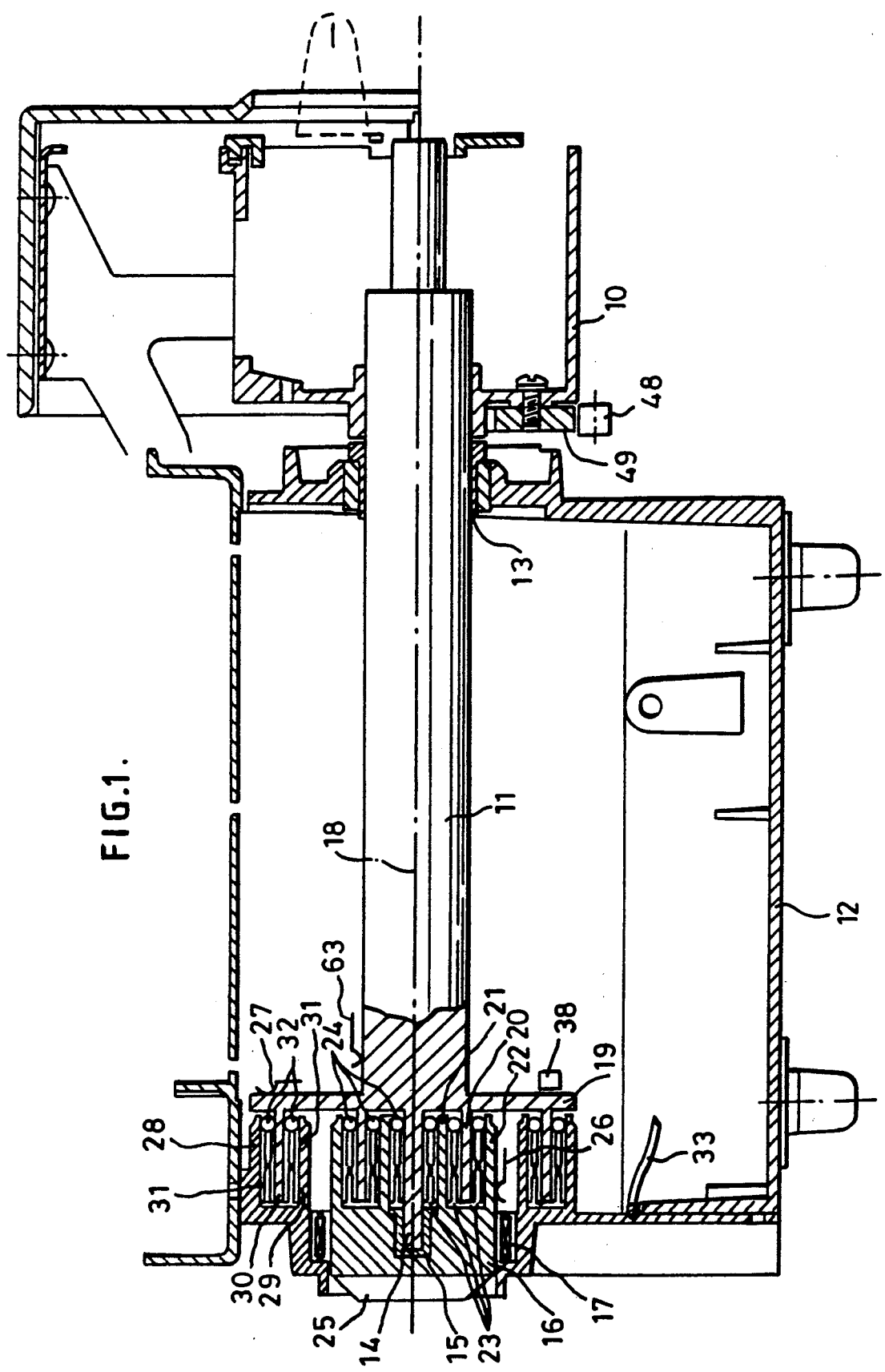
FIG. 1 is a vertical section showing a drive and brake for a print drum of a franking machine.

A print drum 10 is secured on one end of a drive shaft 11 and is rotatable by rotation of the shaft. The shaft is mounted for rotation in a franking machine chassis 12 by means of a bearing 13. The other end of the drive shaft 11 is formed with a central support pin 14 aligned with the axis of the drive shaft. The free end of the support pin 14 is supported in a cup bearing 15 mounted in a drive hub 16. The hub is mounted for rotation in the chassis 12 by means of a bearing 17. The bearings 13, 15 and 17 are co-axial and hence the drive shaft 11 and the drive hub 16 are rotatable independently about a common axis 18. The end of the drive shaft adjacent the drive hub 16 is formed with a circular flange 19 from which an annular wall 20 extends concentrically with the common axis 18. The drive hub is formed with two walls 21, 22 which extend concentrically with the common axis such that the wall 21 lies between the support pin and the wall 20, and the wall 22 extends around the exterior of wall 20. The dimensions of the annular walls are such that there is an annular space 23 between each adjacent wall and between the pin 14 and the wall 21. These spaces 23 are closed by 'O' ring seals 24 and are filled with a fluid. The drive hub 16 is formed with drive engagement means 25 for mechanically coupling a power drive (not shown) driven by an electric motor housed in a base for the franking machine. The fluid material used for filling the spaces 23 is a material which exhibits an electro-rheological property such that under normal conditions the material is fluid but when it is subjected to an electrical field of sufficient magnitude the orientation of the molecules of the material is changed and the material becomes solid. Thus the material provides a selectively operable clutch for selectively transmitting drive from the drive hub to the drive shaft.

When the franking machine is powered, the power drive in the base is energized and applies power to rotate the drive hub 16. If no electric field is applied to the fluid in the spaces 23, the material therein is in its fluid state and the drive shaft 11 is not driven by the rotating drive hub. However when an electric field is applied to the material, the material is changed into a solid state and tends to bond the drive hub and the drive shaft so that it is effective to transmit drive from the hub to the shaft and thereby cause rotation of the print drum 10. The electric field is applied by means of sliding brush connections 26, 27 and 63 making electrical contact with the hub and the shaft respectively. Thus the electro-rheological material provides an electrically operated clutch between the drive hub and the drive shaft.

The chassis 12 is formed with two spaced annular walls 28 and 29 concentric with the common axis 18 and extending towards the flange 19. The flange 19 is formed with an annular wall 30 concentric with the common axis 18 and extending into the space between the walls 28 and 29. The dimensions of the walls 28, 29 and 30 are such that there are spaces 31 therebetween. These spaces are closed by 'O' ring seals 32 and the spaces are filled with material exhibiting electro-rheological properties. An electric field may be applied to the material in the spaces 31 by means of the brush connection 27 to the shaft or flange 19 and by means of a fixed terminal 33 to the chassis. When the electric field is applied the material tends to bond the shaft to the chassis and acts as a brake and, when the field is removed, the shaft is free to rotate. When the franking machine is not printing a franking impression, the print drum 10 is held stationary by preventing rotation of the shaft 11 by the application of the electric field to the material in the spaces 31. However, when a franking impression is to be printed, the electric field is removed from the material in the spaces 31 to permit rotation of the drum and an electric field is applied by means of brushes 26 and 63 to the material in the spaces 23 to cause rotational drive to be transmitted to the shaft to rotate the drum 10.

Generally a field strength of approximately 3KV/mm is required to ensure that the electro-rheological material is sufficiently solid to transmit reliably the rotational drive iron the drive hub to the drive shaft. A similar field strength is required to provide adequate braking force to the shaft to prevent rotation thereof. The electric field may be uni-directional or alternating. The change of state from fluid to solid may be relatively rapid and be achieved in a period of approximately 3ms. However where it is desired to apply the drive more gradually, the change of state may be caused to occur over he material, the viscosity of the material being dependent upon the magnitude of the electric field applied thereto.

The electric potential for the applied field may be generated by means of a switch mode power supply device operating at high frequency. With a spacing of the annular walls of approximately 0.5 mm a potential of approximately 1.5KV would be required. At ambient temperature, the current demand is approximately 1 uA rising to about 20 uA at high operating temperatures. FIG. 2 shows a power supply 72 to produce the high potential using a switch mode or voltage step up device 34 which is controlled by a ramp control circuit 35 to produce desired on/off and off/on gradients for the application and removal of the electric field. The ramp control circuit may be controlled by a control signal on line 36. It is preferred to provide a current limiting circuit 37 to prevent excess current flow at the high potential. The clutch and brake may be energized from a single potential source with switches controlling the application of the high potential selectively to the clutch and brake. However it may be preferred to use two separate potential sources 72 and 73 so that switching can be effected at low potential. The source 73 is of similar construction to that of source 71. The potentials generated by the sources are controlled by a controller, such a microprocessor 74, outputting control signals on lines 36 and 75.

Figure 5:
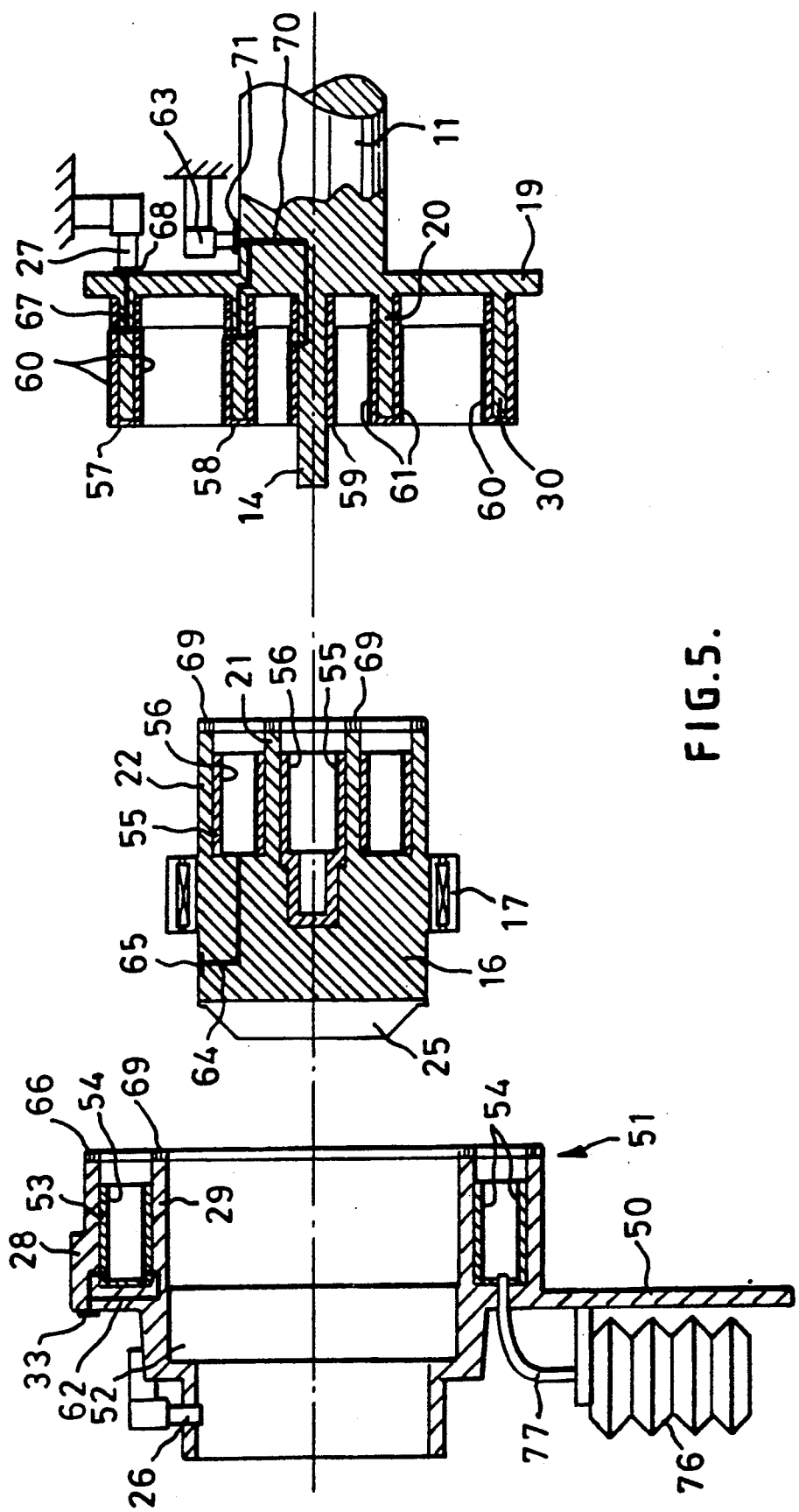
FIG. 5 is an exploded sectional view of one construction of clutch and brake components.

Small changes in volume of the fluid in the spaces between the annular walls due for example to changes in temperature may be accommodated by permitting limited lengthwise movement of the hub 16 and drive shaft 11 relative to the chassis or by movement of the seals. However if larger changes in volume need to be accommodated, an expansion chamber may be provided to receive any excess volume of fluid when the fluid expands and to return the fluid when the fluid subsequently contracts. One form of expansion chamber is shown in FIG. 5 and comprises a bellows form chamber 76 connected by a pipe 77 to the space between the annular walls of the brake. A similar expansion chamber may be provided for the fluid in the spaces between walls of the clutch elements. An alternative expansion chamber may comprise a cylindrical bore communicating with the spaces between the annular walls. A piston sealed to the wall of the cylindrical bore is slidable in the bore against the action of a spring so that upon expansion of the fluid the piston is moved is opposition to the spring force and upon contraction of the fluid the spring returns the piston in the opposite direction. As shown in the drawings, the spaces between each group of co-operating walls are separately sealed. However if desired a single seal between the outer wall 28 of the brake and the periphery of the flange 19 may be provided so that a common volume of the electro-rheological fluid occupies the spaces between all the walls. With this arrangement, only a single expansion chamber would be required and this chamber would communicate with the space between annular walls 28, 29 in the element 51 as shown in FIG. 5 to accommodate expansion and contraction of the common volume of fluid.

It is to be understood that different numbers of spaced annular walls may be provided in dependence upon the magnitude of force required to be transmitted by the clutch or to be resisted by the brake.

It will be appreciated that the elements of the clutch and brake mechanisms between which electric potentials are applied to operate the clutch and brake mechanism must be electrically isolated from one another. This may be effected by manufacturing the elements of appropriate insulating materials or by constructing these elements in such a manner as to include an electrically isolating portion therein. Constructional details of the clutch and brake elements are shown in FIGS. 5 and 6.

Referring first to the construction shown in FIG. 5, the brake and clutch elements are of metallic construction with electrically isolated electrodes. An end wall 50 of the chassis 12 of metallic construction has an annular member 51, formed integrally with the end wall 50, to provide a seat 52 for bearing 17 and annular walls 28, 29. An annular layer 53, of 'U' shaped cross section, of electrically insulating material extends on opposed faces of the walls 28, 29 and an annular layer 54, of 'U' shaped cross section, of electrically conductive material extends over the layer 53 to form an electrode electrically isolated from the end wall 50 and annular member 51. Similarly the drive hub 16 of metallic construction has annular layers 55 of electrically insulating material supporting layers 56 of electrically conductive material forming electrodes electrically isolated from the metallic material of the hub 16. The shaft 11, support pin, flange 19 and walls 20, 30 are formed integrally and are of metallic construction. Annular layers 57, 58 of 'U' shaped cross section, of electrically insulating material extend on both faces of the walls 20 and 30 respectively and another layer 59 of electrically insulating material extends around the support pin 14. The layers 57, 58 extend over the free edges of the walls 20, 30. Electrically conductive layers 60 extend over the layer 57 on the wall 30 to form electrodes electrically isolated from the metallic material of the shaft 11. Further electrically conductive layers 61 extend over the layers 58, 60 to form electrodes. Electrically conductive paths 62 extend through the annular member 51 to a terminal 33 to enable electrical connection to be made to the electrodes formed in the member 51. The paths 62 and terminal 33 are electrically isolated from the member 51 but for clarity in the drawing the insulation material providing such isolation is not shown. Similarly electrically conductive paths 64 extend through the hub 16 to a slip ring 65 to enable electrical connection to the made by means of a brush 26, mounted on the annular member 51, to the electrodes formed in the hub 16. Electrically conductive paths 67 extend from a slip ring 68 on the flange 19 to the electrodes 60 to enable electrical connection by means of a brush 27 mounted on the chassis 12 to the electrodes 60. Further conductive paths 70 extend from a further slip ring 71 to the electrodes 61 to enable electrical connection by means of brush 63, mounted on the chassis 12, to the electrodes 61.

In an alternative construction of the clutch and brake elements shown in FIG. 6, the elements are formed of reinforced synthetic plastics material and hence are not electrically conductive. This permits the electrically conductive layers forming the electrodes to be deposited or otherwise formed directly on the material from which the elements are formed without the need for the provision of insulating layers.

The electrically conductive layers forming the electrodes of the clutch and brake may be deposited by electro deposition or vacuum plating. Alternatively the electrodes may be formed of conductive foil or may be machined or drawn and bonded to the insulating supports.

Instead of using 'O' ring seals as shown in FIG. 1, face seals 66, 69 may be secured to the free edges of walls on the annular member 51 and to the free edges of walls on the hub 16 to seal against the flange 19. When it is desired that a common volume of fluid occupies the spaces between the annular walls, the seals 69 may be omitted and only the seal 66 on wall 28 is provided.

It is to be understood that the brush connections 26, 27 and 63 are shown by way of example only and they may be positioned at other positions to make electrical contact with the drive hub and drive shaft respectively. While hereinbefore the clutch and brake elements have been described as having electrically isolated electrodes, it will be appreciated that if desired the electrodes on one element need not be electrically isolated. For example the electrodes 60, 61 may be connected in common and need not be electrically isolated from the shaft 11.

Operation of the clutch and brake is controlled by the microprocessor 74 to effect rotation of the print drum through a single revolution to effect printing of a franking impression during a franking operation and to brake the drum from rotation in intervals between franking operations positional information relating to the rotational position of the print drum is provided to the microprocessor by an electro-optic sensor 38, positioned adjacent the flange 19, sensing a coded reflective pattern carried by the flange 19. The microprocessors is programmed in a franking program routine to initiate printing of the franking impression by removing the electric field from the material in the spaces 31 of the brake and applying the electric field to the material in the spaces 23 of the clutch so that the print drum is driven to rotate. When the microprocessor receives signals from the sensor 38 indicating that the print drum is approaching the end of the required single revolution, the microprocessor controls application of the electric potential to the material of the brake and removal of the electric field from the material of the clutch to bring the print drum to rest at a predetermined angular rest position. If after initiation of a printing operation, the microprocessor receives signals from the sensor 38 indicating that the print drum is not rotating or is not rotating at the correct speed, due for example to a fault condition or mail feed jam, the microprocessor preferably removes the electric field from the clutch to disable the drive to the print drum thereby preventing overloading of the drive motor in the base of the machine.

An interlock ratchet, shown in FIG. 3, is provided to prevent forcible rotation of the print drum in a reverse direction. The interlock comprises a disc 43 having ratchet teeth 39 and two pivoted pawls 40, 41. The disc is secured to and rotates with the print drum in the direction of arrow 42. The pawls are mounted on the chassis 12 and are spring biased into engagement with the teeth of the disc. In the event of any reverse rotation of the print drum, one or other of the pawls 40, 41 will pivot into engagement with one of the ratchet teeth 39 and prevent such reverse rotation.

A security interlock, illustrated in FIG. 4, is provided to prevent rotation of the print drum when the franking machine is not powered. A disc 44, secured to and rotating with the print drum, has a recess 45 for entry of an interposer 46 mounted on the chassis 12. The interposer is spring biased to enter into the recess and thereby prevent rotation of the disc 44 and hence of the print drum. The recess is made with sufficient angular extent to ensure that the interposer has adequate time to fully enter the recess. The interposer is retracted from the recess, to permit rotation of the disc and print drum, by means of an actuator 7S comprising a solenoid energized continuously when electrical power is applied to the franking machine. Energisation of the actuator is controlled by the microprocessor. Thus when the franking machine is powered, the print drum is held stationery by energisation of the brake during intervals when a franking operation is not be performed but is free to be rotated to perform a franking operation because energisation of the solenoid retracts the interposer. However when the franking machine is not powered, the solenoid is not energized and the print drum is prevented from rotation by the entry of the interposer into the recess 45.

The disc 43 carrying the ratchet teeth 39 and the disc 44 with the recess 45 may be formed integrally with the flange 19.

In order to prevent loading of the interposer 46 due to engagement of an abutment 47 at the end of the recess therewith which, if sufficient magnitude, may prevent retraction of the interposer by the solenoid, the print drum is retained in a rest position by means of a spring loaded cam roller 48, mounted on the base (not shown) of the franking machine, engaging a detent in a cam 49 secured to the print drum. The rest position of the print drum defined by this engagement of the roller 48 with the detent is such that the abutment 47 is spaced from the interposer 46 and hence does not impose any loading on the interposer.

I claim:

1. A franking machine including:
    a chassis member;
    a shaft;
    first bearing means supporting said shaft on said chassis member for rotation about an axis;
    a first end of said shaft;
    a print drum secured to said shaft and rotatable about said axis by rotation of said shaft;
    at least one first annular wall element carried on a second end, remote from said first end, of said shaft and rotatable with said shaft, said first wall element being concentric with said axis;
    at least one second annular wall element carried on said second end of said shaft and rotatable with said shaft, said second wall element being concentric with said axis;
    a power input drive element;
    second bearing means supporting said drive element on said chassis member for rotation about said axis;
    said first and third wall elements being disposed in opposed relationship defining a first annular space therebetween;
    at least one fourth annular wall element on said chassis member, said fourth wall element being concentric with said axis;
    said second and fourth wall elements being disposed in opposed relationship defining a second annular space therebetween;
    a material filling said first and second annular spaces; said material exhibiting electro-rheological characteristics so that said material has a viscosity which varies with magnitude of electric field to which said material is subjected;
    electronic control means;
    operational mode of the franking machine to apply a first electric potential between said second and fourth wall elements of first magnitude to cause said material to have a viscosity such as to prevent relative movement of said second wall element relative to said fourth wall element and thereby prevent rotation of said shaft and said print drum about said axis;
    said electronic control means being operative upon initiation of an operational print cycle to reduce said first electric potential to a second magnitude to permit rotation of said print drum and to apply a second electric potential between said first and third wall elements of third magnitude to cause said material to have a viscosity such as to transmit rotation of said drive element to said shaft and said print drum through a single revolution so that said print drum is rotated through a single revolution to effect printing of a franking impression; and
    said control means being operative upon completion of said single revolution of said shaft and said print drum to decrease said second electric potential to a fourth magnitude to terminate transmission of rotation from said drive element to said shaft and to increase said first electric potential to said first magnitude to prevent rotation of said shaft and said print drum.

2. A franking machine as claimed in claim 1 wherein the first bearing means includes third bearing means supporting the shaft on the drive element for relative rotation about the axis between said shaft and said drive element.

3. A franking machine as claimed in claim 2 wherein the third bearing means includes a pin on the shaft extending away from the first end of the shaft and concentric with the axis; and a bearing in the drive element receiving said pin.

4. A franking machine as claimed in claim 1 wherein the first, second, third and fourth wall elements are cylindrical.

5. A franking machine as claimed in claim 1 wherein the shaft and drive element are electrically conductive and including electrically insulating means located between said shaft and the first and third wall elements and between said drive element and the second wall element.

6. A franking machine as claimed in claim 1, wherein the shaft and the drive element are electrically insulating and the first, second and third wall elements comprise electrically conductive layers deposited on said shaft and drive element.

7. A franking machine as claimed in claim 1 including interposer means secured to and rotatable with the print drum;
    an abutment on said interposer means;
    said interposer extends to be engaged by said abutment to prevent rotation of said print drum; and
    in which the control means is operative to withdraw said interposer from said operative position to permit rotation of the print drum during a print cycle.

8. A franking machine as claimed in claim 7 including detent means and a detent co-operating with said detent means; said detent means and said detent being relatively located to retain said print drum in a rotational position in which the abutment is retained in spaced relationship to said interposer.

9. A franking machine as claimed in claim 1 including power supply means to supply the second electrical potential and wherein the control means includes a ramp control circuit operative to control the magnitude of said second electrical potential to increase said second electrical potential from the fourth to the third magnitude with a predetermined gradient relative to time upon initiation of the print cycle.

10. A franking machine as claimed in claim 9 wherein the power supply means supplies the first electrical potential and the ramp control circuit is operative to control the magnitude of said first electrical potential to increase said first electrical potential from the second to the first magnitude with a predetermined gradient relative to time upon completion of the print cycle.

* * * * *